(12) United States Patent
Spotka

(10) Patent No.: US 8,973,605 B2
(45) Date of Patent: Mar. 10, 2015

(54) ACTUATING DEVICE FOR HOUSED OR HOUSINGLESS VALVES

(75) Inventor: Rudolf Spotka, Nürnberg (DE)

(73) Assignee: Bu-sch Armaturen GmbH, Nurnberg (DE)

( * ) Notice: Subject to any disclaimer, the term of this patent is extended or adjusted under 35 U.S.C. 154(b) by 285 days.

(21) Appl. No.: 13/511,521

(22) PCT Filed: Nov. 16, 2010

(86) PCT No.: PCT/EP2010/006976
§ 371 (c)(1),
(2), (4) Date: May 23, 2012

(87) PCT Pub. No.: WO2011/063904
PCT Pub. Date: Jun. 3, 2011

(65) Prior Publication Data
US 2012/0280155 A1    Nov. 8, 2012

(30) Foreign Application Priority Data

Nov. 26, 2009   (DE) .......................... 10 2009 055 741

(51) Int. Cl.
*F16K 37/00* (2006.01)
*F16K 31/05* (2006.01)

(52) U.S. Cl.
CPC ..................................... *F16K 31/05* (2013.01)
USPC ................. 137/554; 251/129.03; 251/129.11; 251/248

(58) Field of Classification Search
CPC ............................... F16K 31/04; F16K 31/055
USPC ................ 137/554; 251/129.03, 129.11, 248, 251/249.5
See application file for complete search history.

(56) References Cited

U.S. PATENT DOCUMENTS

| 3,863,888 A | | 2/1975 | Hines |
| 3,921,264 A | * | 11/1975 | Madonian et al. ............ 475/154 |
| 4,285,496 A | * | 8/1981 | Coles ........................ 251/129.03 |
| 4,712,983 A | * | 12/1987 | Moynihan ..................... 417/234 |

(Continued)

FOREIGN PATENT DOCUMENTS

| DE | 23 46 067 | 3/1975 |
| DE | 43 44 325 | 6/1995 |

(Continued)

*Primary Examiner* — Matthew W Jellett
(74) *Attorney, Agent, or Firm* — Hamre, Schumann, Mueller & Larson, P.C.

(57) ABSTRACT

The invention relates to an actuating device for housed or housingless valves; in particular for valves for pipelines for transporting liquid or gaseous medium, preferably for pipelines above a nominal diameter of DN 100 or channels, having a drive motor, having a gearing (2), and having an emergency running drive (3) by means of which the gearing (2) can be actuated independently of the drive motor, wherein as a drive motor a servo motor (4) is provided which has a measuring device which determines the respectively present position of the servo motor (4) in relation to its initial position and outputs corresponding measured values, a working memory is provided into which the measured values of the measuring device of the servo motor (4) are written, an electronic control unit (8) is provided which reads out the measured values of the measuring device of the servo motor (4); and performs position control of the servo motor (4) and therefore of the actuating device on the basis of the measured values from the measuring device of the servo motor (4).

13 Claims, 3 Drawing Sheets

(56) References Cited

U.S. PATENT DOCUMENTS

| | | | |
|---|---|---|---|
| 4,754,949 A * | 7/1988 | Fukamachi | 251/129.03 |
| 4,771,807 A * | 9/1988 | Karani | 137/553 |
| 4,926,903 A * | 5/1990 | Kawai | 137/554 |
| 5,614,031 A * | 3/1997 | Cushing | 134/33 |
| 5,831,406 A | 11/1998 | Bleibinhaus et al. | |
| 5,884,898 A * | 3/1999 | Miyairi | 251/305 |
| 6,084,370 A | 7/2000 | Moller | |
| 6,343,615 B1 * | 2/2002 | Miller et al. | 137/202 |
| 6,953,084 B2 * | 10/2005 | Greeb et al. | 166/66.4 |
| 7,059,418 B2 * | 6/2006 | Greeb et al. | 166/387 |
| 8,342,478 B1 * | 1/2013 | Cordray et al. | 251/129.03 |
| 2004/0003710 A1 | 1/2004 | Pinot | |
| 2004/0056229 A1 | 3/2004 | Biester | |
| 2004/0134665 A1 * | 7/2004 | Greeb et al. | 166/379 |
| 2012/0045347 A1 * | 2/2012 | Dvorak | 417/269 |
| 2012/0199767 A1 * | 8/2012 | Mori et al. | 251/129.03 |

FOREIGN PATENT DOCUMENTS

| | | |
|---|---|---|
| DE | 695 02 338 | 12/1998 |
| DE | 10 2007 031 429 | 1/2009 |
| FR | 1 328 431 | 5/1963 |
| JP | 2631635 | 4/1997 |
| WO | WO 02/065006 | 8/2002 |
| WO | WO 02/095926 | 11/2002 |
| WO | WO 03/100950 | 12/2003 |

* cited by examiner

ACTUATING DEVICE FOR HOUSED OR HOUSINGLESS VALVES

The present invention relates to an actuating device for housed or unhoused valves, in particular for valves for pipelines for transporting liquid or gaseous medium, preferably for pipelines above a nominal diameter of DN 100 or channels.

The actuating device according to the invention is provided, in particular, for driving rotating drive elements with a rotating means of more than 360°.

PRIOR ART

The DE 43 44 325 A 1 describes an actuating device. This actuating device comprises an electric motor, which drives a single stage planetary gearbox by means of a backing gearing and a motor driven worm. The output of said planetary gearbox is connected to the valve. In addition, an additional worm, which is to be actuated by means of a hand wheel, is provided as a standby gear, which is arranged on the planetary gearbox in such a way that it lies opposite the motor driven worm. With a suitable choice of gear wheels it is possible to achieve with the single stage planetary gearbox in power drive mode a speed increasing gear ratio of approximately 1:2 and for manual drive mode a speed increasing gear ratio of 1:3. For the total gear ratio in manual drive mode a ratio of 12:1 is specified. The end positions of the drive are determined by dedicated limit switches.

Furthermore, the DE 23 46 067 discloses a drive device for driving translatory moving actuators, in particular, valves with a planetary gearbox, which can be driven by means of small, reversible electric drive motors with an end position switch-off mechanism. In addition, there is a spur gear that can also be actuated by the drive motor, but also by means of a hand crank.

The brochure "AUMA Solutions for a World in Motion - Actuator Control" describes a broad spectrum of actuating devices for valves using so-called three phase asynchronous motors. They are rugged motors, in which the three phases of the voltage supply have to be supplied in the correct sequence. This type of drive requires an automatic phase correction that automatically adapts the actuation of the motor to the applied three phase rotating field, in order to avoid malfunctions. This type of drive acts together with the limit switches that are designed in such a way that the motor current is guided directly over them. Upon the response of such a switch in the end position, the power supplied to the motor is immediately interrupted. The indication of the position of the motor is implemented by means of a mechanical position indicator that is coupled directly to the drive and, thus, to the valve shaft by way of a shaft. Therefore, such drives are complicated with respect to their design configuration and, hence, justify larger types of designs. In addition, the design of the drives has the drawback that different model variants of the drives are provided for different applications, in particular different torque ranges and/or speed ranges.

Object

The object of the present invention is to provide a novel actuating device that is intended for valves of the type conforming to their genre and that overcomes the aforementioned drawbacks.

Solution

The aforementioned object is achieved in that a servo motor is provided as the drive motor; and this servo motor has a measuring device that determines the respective current position of the servo motor in relation to its initial position and outputs the corresponding measured values; and a working memory is provided, and the measured values of the measuring device of the servo motor are written into this working memory; and an electronic control unit is provided, and this electronic control unit continuously reads out the measured values of the measuring device of the servo motor and performs a position control of the servo motor and, therefore, of the actuating device on the basis of the measured values from the measuring device of the servo motor.

On the one hand, the invention has the effect of reducing the dimensions of the actuating device; and, on the other hand, it achieves a simplified design, because it is possible to dispense with the mechanical limit switches and the mechanical position indicators.

Compared to the actuating devices known from the prior art, the use of the servo motor makes it possible to implement the standby drive with simple auxiliary means, for example a battery powered screw driver. This approach is possible because the torque of a battery powered screw driver is similar in terms of size to the torque of a servo motor.

Since the output side of the servo motor is connected to the drive side of the gearbox without a speed transforming transmission, it is possible to connect the two components together in a very simple way without interpositioning a gearbox, a feature that has a considerable influence on the reduction of the size of the complete arrangement.

The actuating device is best designed in such a way that when operating the standby drive, the servo motor is also rotated accordingly. Therefore, the invention has the advantage that there is no need to provide a complicated design for uncoupling between the gearbox and the servo motor. Furthermore, when actuating the standby drive, the position determination is still ensured due to the rotation of the servo motor.

Insofar as the gearbox has to be driven by means of the standby drive, for example, when the power fails or the like, it is an advantage that the establishment of a direct force flow connection is adequate. Hence, a speed transforming gear is not necessary.

Then the standby drive can be, according to a practical embodiment, in a passive position and does not become active until a coupling of the standby drive with the drive shaft of the gearbox has taken place.

In a practical embodiment the gearbox has at least a gear ratio of 40:1, preferably 70:1, even more preferably 90:1. Ideal is a range between 60:1 and 80:1—for example, 70:1.

In a practical embodiment the torque of the servo motor is maximally 30 M·m, preferably maximally 20N·m, even more preferably maximally 10N·m. Ideally the servo motor has a torque ranging from 3 to 8N·m, even more highly preferred 4 to 7N·m.

In a practical embodiment the measured values of the measuring device of the servo motor involve count pulses with respect to the rotational movement of the servo motor. These count pulses can be evaluated for the continuous position determination and/or speed determination of the opening or closing movement of the valve and can be fed to the control unit. This approach makes it possible to perform, as a function of the position of the valve, the opening or closing movement of said valve at different speeds—that is, to program particular speed characteristics. In particular, when the valve is still closed and under the resulting water pressure, it is possible to provide a slow opening speed that is then increased on reaching a specific position—that is, when the water pressure is no longer present or has decreased.

In addition to the aforementioned position determination, a practical embodiment provides that there can also be a measuring device that makes available a reference point for the counterforce acting on the servo motor. The measuring device can best be designed as a force measuring device and/or a measuring device that detects the current consumption of the servo motor. Both ensure in each case the finding of a position point, at which the force that is needed by the servo motor exceeds a specified maximum value—that is, when the slide valve is in the sealing end position (closing position). In addition, the measuring device makes it possible to establish gradations or a profile of the force, required by the servo motor, by means of the path of motion of the valve. For example, at the beginning of the opening action the force to be made available by the servo motor must be set higher and, in particular, due to a "locking effect" of a closed valve that has not been actuated, for example, for a long time.

The measuring device also makes it possible to perform a load dependent readjustment of the opening and/or closing speed.

An especially advantageous embodiment of the actuating device is characterized in that it has a self-locking device. In the event of a loss of power, the valve, which may be a device having a high weight, stays in the instantaneous position. The reason for this behavior lies in the high gear ratio of the torque between the servo motor and the gearbox. Moreover, a servo motor does not have an overrun. The aforementioned advantage also becomes apparent on switching off the servo motor at any arbitrary location. The result is that no pressure is subsequently exerted on the moving parts of the structure, so that there is no need for additional design measures to compensate for such a subsequent application of pressure.

The standby drive can be powered in an advantageous way, for example, by means of a battery powered screw driver that is independent of the power supply system. As an alternative, however, a standby drive can also be achieved by means of a manual drive (for example, a hand wheel, screw driver, etc.).

An especially space saving design is achieved by arranging the servo motor and the gearbox along a common axis. In this case the actuation of the standby drive can be provide at an angle—preferably a right angle—to said common axis. In the ideal case the result of this feature is that there is only one direction of force even for the motor driven drive of the gearbox, a feature that is especially advantageous for a compact configuration.

In a practical embodiment the gearbox is a planetary gearbox that lends itself very well for the use of a servo motor.

EXEMPLARY EMBODIMENT OF THE INVENTION

A practical exemplary embodiment of the invention is explained in detail below with reference to the figures in the drawings.

Referring to the drawings.

Figure 1:
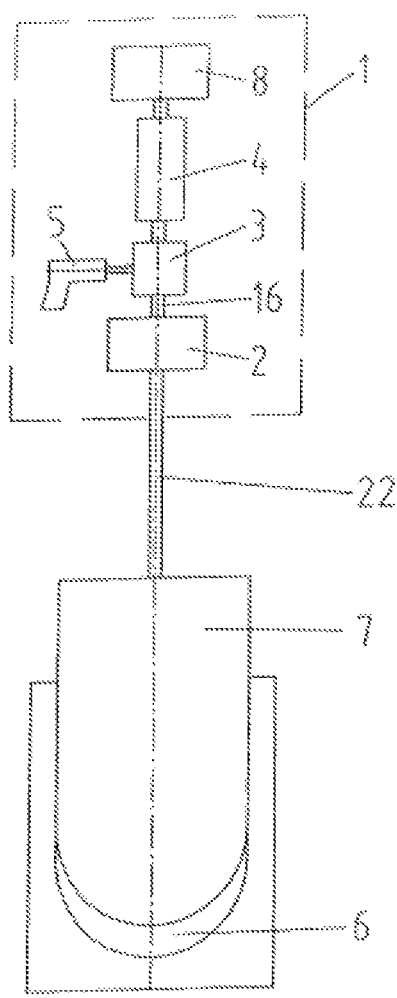
FIG. 1 is a highly simplified schematic drawing of one embodiment of the inventive actuating device in use with a slide valve as the valve.

The reference numeral 1 in FIG. 1 denotes the actuating device in its entirety. Said actuating device comprises a gearbox 2—preferably a planetary gear system. The output shaft 22 of the gearbox 2 is connected to a valve—a slide valve 7 in the present embodiment. The slide valve 7 is provided for the purpose of closing or releasing, as desired, a pipeline 6, which is indicated in schematic form.

By actuating the output shaft 22 of the gearbox 2, the slide valve 7 is induced by a mechanism, which is not shown in FIG. 1, to move either upwards or downwards. It is explicitly pointed out that the actuating device according to the invention can also be used for valves of a different type.

The actuating device is provided primarily for valves in connection with pipelines above a nominal diameter of DN 100.

The gearbox is connected by way of a standby drive 3 to an electric motor, which is conceived, according to the present invention, as a servo motor 4, on the side of the gearbox 2 that lies opposite the slide valve 7. In this case the servo motor is an electric motor that forms with a servo controller a servo drive and is driven in a closed loop control system. In order to detect the rotor position of the servo motor 4, said servo motor is provided with a measuring device that determines the current position—for example, the rotational angle travelled by the rotor in relation to an initial position of the rotor. In order to drive the servo motor 4, there is a control unit 8.

The control unit 8 can also be a concrete component of the servo motor 4. As an alternative, the control unit 8 can also be positioned at a different location than the location of the servo motor 4 and can be connected to said servo motor by means of a data line.

FIG. 1 shows that the servo motor 4 and the gearbox 2 lie on a common longitudinal axis.

The region of the standby drive 3 has the coupling points for attaching an auxiliary tool, such as a battery powered screw driver 5, in the event that, for example, a loss of power necessitates a standby actuation of the slide valve 7.

Figure 2:
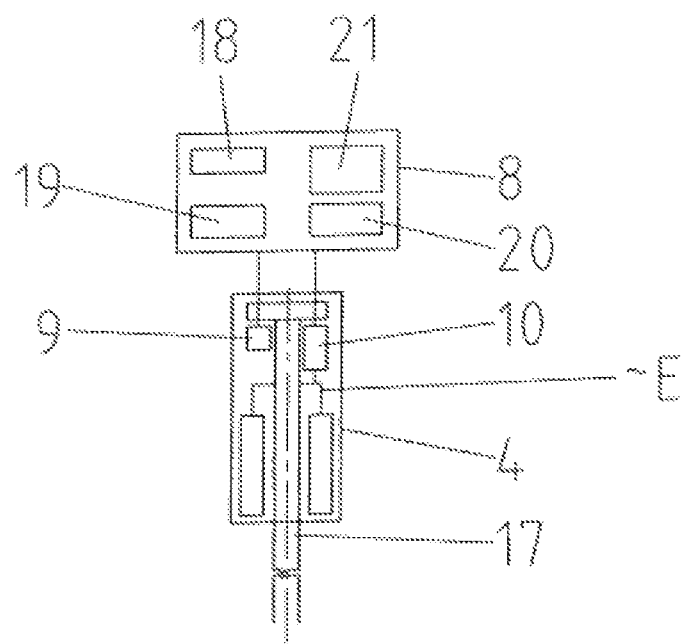
FIG. 2 is a highly simplified schematic drawing of the servo motor, including its control unit.

It is clear from FIG. 2 that the servo motor 4 has, as the measuring device, a counter 9, which makes it possible to detect the rotary motion of the rotor of the servo motor 4 or more specifically its shaft 17. For example, the counter 9 generates 32,000 pulses during one revolution of the shaft of the servo drive.

These count pulses are further processed in the control unit 8 and further processed into position characteristic data by means of logic functions that are not shown in FIG. 2. The count values or rather position characteristic data are stored in a memory 18 and constantly read out. The core of the control unit is a processor 19. Furthermore, an input field 20 and a display 21 are provided.

In addition, there may be a measuring device 10, with which the force acting on the servo motor 4 can be determined and can be used during the control operation.

Figure 3:
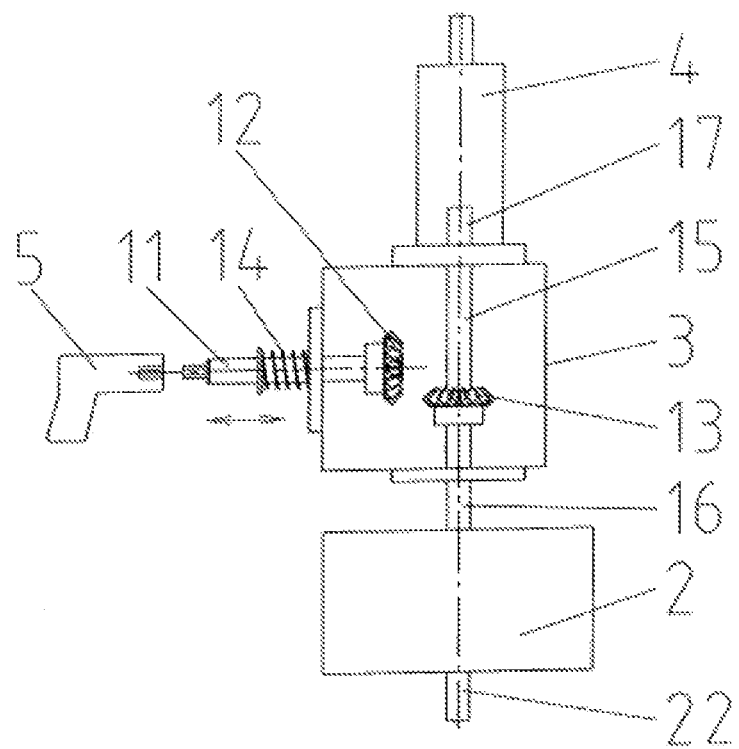
FIG. 3 is a highly simplified schematic drawing of the connecting region between the servo motor and the gearbox, at which the standby drive is provided.

FIG. 3 shows in detail the connecting region of the servo motor 4 and the gearbox 2. The shaft 17 of the servo motor 4 is connected directly to the drive shaft 16 of the gearbox 2 without a speed transforming transmission. The region of the direct connection has the standby drive and, in particular, in the form of a drive shaft 11, which is positioned at right angles. The one end of said drive shaft is provided with a bevel wheel 12; and the other end of said drive shaft is provided with an optional coupling to a battery powered screw driver 5. The drive shaft 11 is prestressed in a position towards the outside by means of a spring 14.

A bevel wheel 13 is also positioned on the drive shaft 16 of the gearbox 2 in such a way that the two bevel wheels 12 and 13 are at right angles to each other. The axial pressure on the drive shaft 11 allows the drive shaft to move in the direction of the bevel wheel 13, so that the two bevel wheels 12 and 13 can mesh; and, in so doing, the drive shaft 16 of the gearbox 2 can be driven by actuating the battery powered screw driver 5.

When the drive shaft 16 of the gearbox 2 is actuated by the battery powered screw driver 5, the shaft 17 of the servo motor 4 also rotates accordingly due to the absence of a separation. When the battery powered screw driver 5 is removed, the drive shaft 11 moves back again into the passive position due to the spring 14.

Since the servo motor 4 in connection with the control unit 8 makes it possible to determine the position of the valve—that is, in this case the position of the slide valve 7—independently of the mechanical limit switches, it is also much easier to install the valves; in particular, the initial installation is simpler.

For example, the slide valve travel or rather stroke in the factory setting is preset to, for example, 116 revolutions. However, in the course of the installation of the slide valve 7 there may be, for example, local conditions, such as nonlinear walls or the like, that render the preset stroke at 116 revolutions inadequate. Therefore, the control unit 8 induces the servo motor 4 to continue rotating until the valve—in this case the slide valve 7—moves into the end position, in which the control unit 8 detects the higher counterforce by means of the measuring device 10 and matches with the stroke position (for example, the stroke position in this case amounts to 116.8 revolutions). The new stroke position is stored in this system, in particular, the working memory 18.

In particular, a profile of the changes in the opening or closing speed as a function of the position of the stroke can also be stored in the working memory 18.

LIST OF REFERENCE NUMERALS

1 Actuating device
2 Gearbox
3 Standby drive
4 Servo motor
5 Battery powered screw driver
6 Pipeline
7 Slide valve
8 Control unit
9 Counter
10 Measuring device
11 Drive shaft (standby drive)
12 Bevel wheel (standby drive)
13 Bevel wheel (gearbox)
14 Spring
15 Connecting shaft
16 Drive shaft (gearbox)
17 Shaft (servo motor)
18 Memory
19 Processor
20 Input field
21 Display
22 Output shaft (gearbox)

The invention claimed is:

1. An actuating device for housed or unhoused valves, comprising:
    a servo motor, said servo motor including a shaft;
    a gearbox, said gearbox including a drive shaft; and
    a standby drive, by means of which said gearbox can be actuated independently of said drive motor;
    wherein said servo motor and said gearbox are arranged along a common axis,
    an axis of said standby drive is positioned at an angle to said common axis,
    said standby drive is positioned between said servo motor and said gearbox, and said shaft of said servo motor is connected directly to said drive shaft of said gearbox
    said servo motor has a measuring device that continuously determines a current position of said servo motor in relation to an initial position and continuously outputs corresponding measured values in a form of position characteristic data;
    a working memory, wherein said measured values of said measuring device of said servo motor are written into said working memory; and
    an electronic control unit, which reads out said measured values of said measuring device of said servo motor and performs a position control of said servo motor, and said actuating device on a basis of said measured values of said measuring device of said servo motor, and
    said gearbox has a gear ratio of at least 40:1.

2. The actuating device as in claim 1, wherein said output side of said servo motor is connected to a drive side of said gearbox without a speed transforming transmission.

3. The actuating device as in claim 1, wherein when operating said standby drive, said servo motor is also rotated accordingly.

4. The actuating device as in claim 1, wherein when said gearbox is actuated by said standby drive, a direct force flow connection can be produced between said standby drive and said gearbox.

5. The actuating device as in claim 4, wherein said direct force flow connection is produced by a coupling part that has a variable position that can engage with an additional coupling part that interacts with said gearbox.

6. The actuating device as in claim 1, wherein said gearbox has at least a gear ratio of 70:1.

7. The actuating device as in claim 1, wherein said torque of said servo motor is maximally 30 N·m.

8. The actuating device as in claim 1,
    wherein said measuring device of said servo motor is a counter,
    count pulses resulting from a number of revolutions of said servo motor can be generated by said counter, and
    the count pulses can be evaluated for controlling said actuating device.

9. The actuating device as in claim 1, wherein a counterforce acting on said servo motor can be detected by said measuring device.

10. The actuating device as in claim 1, wherein said standby drive can be actuated by a hand operated drilling machine.

11. The actuating device as in claim 1, wherein said gearbox is a planetary gearbox.

12. The actuating device as in claim 1,
    wherein said standby drive can be actuated by a battery powered screw driver.

13. The actuating device as in claim 12, wherein wherein said gearbox is a planetary gearbox.

* * * * *